United States Patent
Ro

(10) Patent No.: US 7,068,986 B2
(45) Date of Patent: Jun. 27, 2006

(54) METHOD FOR PROCESSING RADIO WAVES, AND AUDIO SYSTEM UTILIZING THE METHOD

(75) Inventor: Kyu Sang Ro, Seoul (KR)

(73) Assignee: Hyundai Motor Company, Seoul (KR)

( * ) Notice: Subject to any disclaimer, the term of this patent is extended or adjusted under 35 U.S.C. 154(b) by 419 days.

(21) Appl. No.: 10/608,950

(22) Filed: Jun. 26, 2003

(65) Prior Publication Data

US 2004/0106388 A1    Jun. 3, 2004

(30) Foreign Application Priority Data

Dec. 3, 2002   (KR) ...................... 10-2002-0076296

(51) Int. Cl.
 *H04B 1/06* (2006.01)
 *H04B 1/10* (2006.01)
 *H04B 1/16* (2006.01)

(52) U.S. Cl. ............... 455/230; 455/232.1; 455/238.1; 455/250.1; 455/343.1; 455/210; 455/226.2

(58) Field of Classification Search ............... 455/230, 455/232.1, 238.1, 239.1, 245.1, 250.1, 343.1, 455/343.2, 343.5, 345, 571–574, 217–225, 455/226.1, 226.3, 506, 65, 67.13
See application file for complete search history.

(56) References Cited

U.S. PATENT DOCUMENTS

| | | | | |
|---|---|---|---|---|
| 4,411,020 A | * | 10/1983 | Imazeki et al. | 455/219 |
| 5,203,024 A | * | 4/1993 | Yamao | 455/133 |
| 5,303,414 A | * | 4/1994 | Brinkhaus | 455/296 |
| 5,507,023 A | * | 4/1996 | Suganuma et al. | 455/234.1 |
| 5,548,836 A | | 8/1996 | Taromaru | |
| 5,758,272 A | | 5/1998 | Hong | 455/234.2 |
| 5,930,693 A | * | 7/1999 | Kennedy et al. | 455/234.1 |
| 6,130,645 A | | 10/2000 | Lindenmeier et al. | 343/704 |

FOREIGN PATENT DOCUMENTS

| | | |
|---|---|---|
| CN | 1112313 | 11/1995 |
| CN | 1175329 | 3/1998 |
| CN | 1239610 | 12/1999 |
| DE | 28 08 745 A1 | 9/1979 |
| JP | 58053212 A | 3/1983 |
| JP | 05-083152 | * 4/1993 |
| JP | 10-336142 | * 12/1998 |
| JP | 2002-222658 | 9/2002 |
| KR | 1997-0077818 | 12/1997 |

* cited by examiner

*Primary Examiner*—Duc M. Nguyen
(74) *Attorney, Agent, or Firm*—Morgan Lewis & Bockius LLP

(57) ABSTRACT

In multi-path regions of high wave strength, noise in produced sounds of a vehicle audio system is reduced due to controlling of amplification of radio waves received by an on-glass antenna on the basis of wave strength at a running position of a vehicle and its change rate.

8 Claims, 3 Drawing Sheets

METHOD FOR PROCESSING RADIO WAVES, AND AUDIO SYSTEM UTILIZING THE METHOD

FIELD OF THE INVENTION

The present invention relates to an audio system of a vehicle, and more particularly, to a method for processing radio waves received at an on-glass antenna of a vehicle and an audio system of a vehicle utilizing the method.

BACKGROUND OF THE INVENTION

Antennas are used for audio systems of vehicles in order to receive radio waves from an external radio transmitting station. Pole antennas attached to vehicle bodies and on-glass antennas fixed to a window (typically, a rear window) of the vehicle are typical examples of such antennas.

Pole antennas show good performance at receiving waves, but they cause an increase in manufacturing cost and mounting processes, and show defects of easy contamination and other problems. Therefore, on-glass antennas have been widely adopted in recent vehicles.

Vehicle audio systems also receive waves reflected from natural/man-made obstacles such as mountains and buildings, as well as waves directly from the transmitting station. Regions where such reflected waves are dominant are frequently called multi-path regions. When a vehicle is running in such a multi-path region, strength of the reflected and direct waves included in the received waves fluctuate such that the strength of the total waves (sum of the reflected and direct waves) also fluctuates.

On the other hand, during processing of radio waves by on-glass antennas, wave signals received at the on-glass antennas are amplified by an amplifier by approximately 5–10 dB, and accordingly a tuner detects the amplified wave signals.

During the amplification of the on-glass antenna signals, noise due to the fluctuation of wave strengths is also amplified. Especially in such a multi-path region, the noise produced at the amplifier becomes great such that noise mixed in sounds also becomes great.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide non-limiting advantages of reduced noise in multi-path regions in a method for processing radio waves received at an on-glass antenna for an audio system of a vehicle. An exemplary audio system of an embodiment of the present invention includes an on-glass antenna fixed to a window of the vehicle for receiving radio waves, an on-glass antenna amplifier for amplifying the signals of the on-glass antenna, a controller for detecting wave strength of the radio waves in a running state of the vehicle and for controlling the on-glass antenna amplifier on the basis of the wave strength, and a tuner for detecting a signal from signals received from the on-glass antenna amplifier, wherein the controller executes instructions for each step of the following method for processing radio waves.

An exemplary method for processing radio waves received at an on-glass antenna according to an embodiment of the present invention includes detecting wave strength of the radio wave at a running vehicle, determining whether the wave strength is above a predetermined strength, calculating change rate of the wave strength when the wave strength is above the predetermined strength, and controlling amplification of the radio wave received by the on-glass antenna on the basis of the change rate of the wave strength.

Preferably, the predetermined strength is about 50 dBuV.

In a further embodiment, the controlling of amplification of the radio waves includes determining whether the change rate of the wave strength is above a reference rate that is obtained as a function of the wave strength, cutting off power supply of an on-glass antenna amplifier for amplifying signals of the on-glass antenna when the change rate of the wave strength is above the reference change rate, and maintaining power supply of the on-glass antenna amplifier when the change rate of the wave strength is not above the reference change rate.

Preferably, the reference change rate is obtained as a first order function with respect to the wave strength, and the first order function produces 15 dB/sec at the predetermined strength of the wave strength and 20 dB/sec at the wave strength of 100 dBuV.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
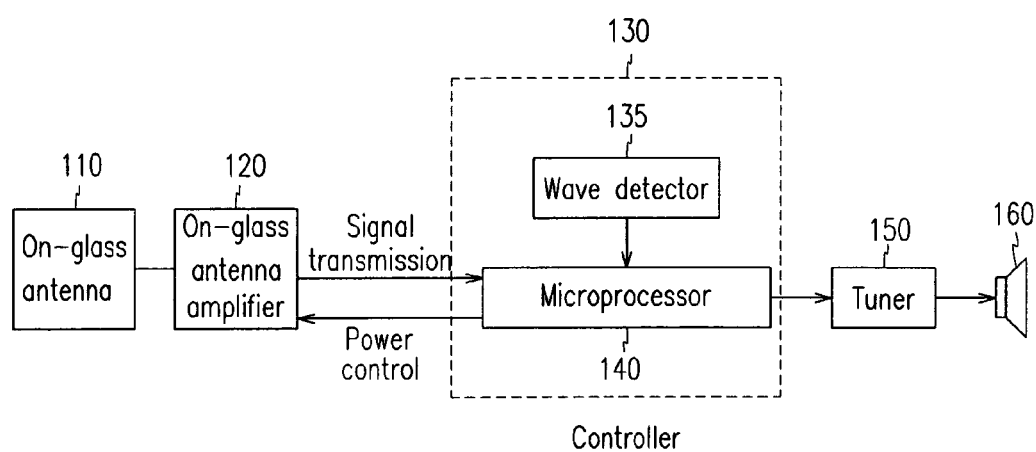
FIG. 1 is a block diagram of an audio system of a vehicle according to an embodiment of the present invention.

As shown in FIG. 1, an audio system of a vehicle according to a preferred embodiment of the present invention includes an on-glass antenna 110 fixed to a window of the vehicle for receiving radio waves, an on-glass antenna amplifier 120 for amplifying the signals of the on-glass antenna 110, a controller 130 for detecting wave strength of the radio wave at a running position of the vehicle and for controlling the on-glass antenna amplifier 120 on the basis of the wave strength; and a tuner 150 for detecting a signal from signals received from the on-glass antenna amplifier 120. The controller 130 executes instructions for each step of a method for processing radio waves according to a preferred embodiment of the present invention.

The on-glass antenna 110 is usually and preferably attached to a rear window of the vehicle, however, the scope of the present invention should not be understood as limited by the position of the on-glass antenna 110.

The on-glass antenna amplifier 120 receives and amplifies signals from the on-glass antenna 110. The amplifier 120 amplifies the received signals by a predetermined amplification rate when electric power is supplied thereto, and only transmits the received signals without amplification when electric power is not supplied thereto. The on-glass antenna amplifier 120 having such functions is obvious to a person of ordinary skill in the art.

The controller 130 includes a detector 135 for detecting wave strength of the radio waves in a running state of the vehicle, and one or more microprocessors 140 activated by predetermined software, and the predetermined software can be programmed to perform each step of a method for processing radio waves according to a preferred embodiment of this invention.

The detector 135, and the tuner 150 for detecting a signal from signals received from the on-glass antenna amplifier, may be selected by a person of ordinary skill in the art. The signal detected at the tuner 150 is transformed to sound at a speaker 160.

Figure 2:
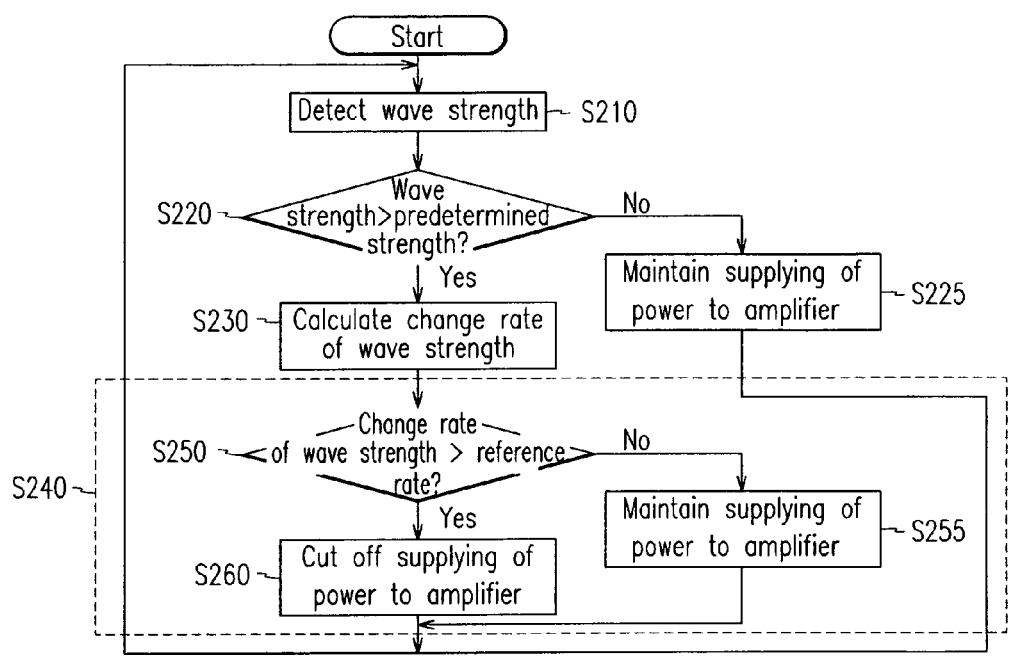
FIG. 2 is a flowchart showing a method for processing radio waves received at an on-glass antenna of a vehicle according to an embodiment of the present invention.

As shown in FIG. 2, firstly at step S210, the controller 130 detects wave strength of the radio waves in a running state of the vehicle, using the interior detector 135. The wave strength is scaled in terms of electric field strength.

Subsequently, at step S220, the controller 130 determines whether the wave strength is above a predetermined strength. A preferable value of the predetermined strength has been experimentally found to be about 50 dBuV.

Wave strength at the running position is compared with the predetermined strength, because, in the case that the wave strength is high, an instantaneous change rate of wave strength (i.e., change rate of electric field strength) is high in a multi-path region and accordingly noise of the on-glass antenna amplifier becomes great.

Therefore, at step S225, the controller 130 maintains supplying electric power to the on-glass antenna amplifier 120 when the wave strength is less than the predetermined strength.

On the other hand, in the case that the wave strength is above the predetermined strength, the controller 130 calculates the change rate of the wave strength at step S230, and subsequently controls amplification of the radio waves received by the on-glass antenna 110 on the basis of the change rate of the wave strength, at step S240. The change rate of the wave strength is scaled, for example, in terms of dB/sec.

The step S240 of controlling amplification of the radio waves is hereinafter described in more detail.

At step S250, the controller 130 determines whether the change rate of the wave strength is above a reference rate. The reference rate is preset as a function of the wave strength.

As a result of experimental observations, it has been found that: noise does not become significant if the change rate of wave strength is less than 15 dB/sec in the case of a 50 dBuV wave strength (i.e., the electric field strength); and noise does not become significant if the change rate of wave strength is less than 20 dB/sec in the case of a 100 dBuV wave strength. Furthermore, for intermediate values between 50 and 100 dBuV, the threshold (maximum) change rates that do not cause significant noise are found to be proportional to wave strengths.

Therefore, it is preferable that the reference change rate is calculated by a first order function with respect to the wave strength, and it is more preferable that the first order function produces 15 dB/sec for the predetermined strength, and 20 dB/sec for 100 dBuV of the wave strength.

Figure 3:
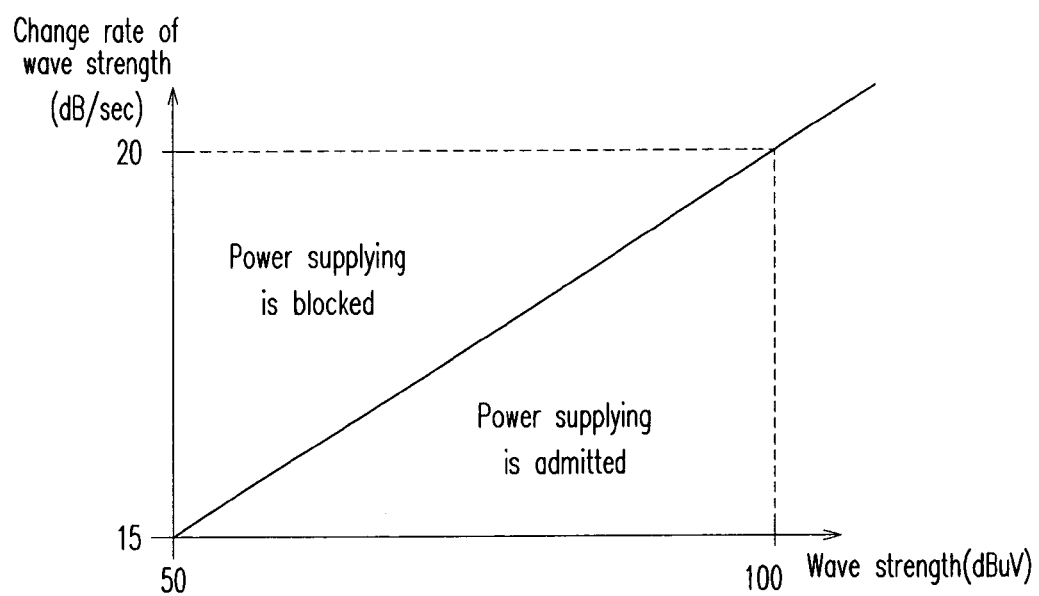
FIG. 3 illustrates an exemplary function of a reference change rate with respect to wave strengths, which is used in a method for processing radio waves received at an on-glass antenna of a vehicle according to an embodiment of the present invention.

FIG. 3 illustrates an exemplary function of a reference change rate with respect to wave strengths, where noise becomes insignificant in the region above the linear graph, and significant in the region below the linear graph.

Therefore, according to the result of the step S250, the controller 130 maintains, at step S255, power supply of the on-glass antenna amplifier 120 when the change rate of the wave strength is not above the reference change rate.

On the other hand, at step S260, the controller 130 cuts off power supply of an on-glass antenna amplifier 120 when the change rate of the wave strength is above the reference change rate.

While power supply to the on-glass antenna amplifier 120 is being maintained at either of steps S225 or S255, the on-glass antenna amplifier 120 amplifies signals received from the on-glass antenna 110, and transmits the amplified signals to the tuner 150. Therefore, the tuner 150 detects signals to be converted to sound from the amplified signals.

On the contrary, while the power is not supplied to the on-glass antenna amplifier 120, the on-glass antenna amplifier 120 only transmits the received signals without amplification (i.e., preventing amplification of noise), and accordingly the tuner 150 detects signals to be converted to sound from the raw signals of the on-glass antenna 110.

In regions where the wave strength is high (e.g., larger than the predetermined strength), the signals received at the on-glass antenna 110 are found to be sufficiently high such that detecting and converting raw signals of the on-glass antenna 110 does not produce significant defects in the converted sound.

As described above, according to a preferred embodiment of the present invention, noise of sound produced in multi-path regions of high wave strength is reduced due to controlling amplification of radio waves received by an on-glass antenna on the basis of wave strength in a running state of a vehicle and its change rate.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A method for processing radio waves received at an on-glass antenna of a vehicle, comprising:

detecting wave strength of the radio wave at a running vehicle;

determining whether the wave strength is above a predetermined strength;

calculating change rate of the wave strength when the wave strength is above the predetermined strength; and controlling amplification of the radio waves received by the on-glass antenna on the basis of the change rate of the wave strength, wherein said controlling of amplification of the radio waves comprises:

determining whether the change rate of the wave strength is above a reference rate that is obtained as a function of the wave strength;

cutting off power supply of an on-glass antenna amplifier for amplifying signals of the on-glass antenna when the change rate of the wave strength is above the reference change rate; and maintaining power supply of the on-glass antenna amplifier when the change rate of the wave strength is not above the reference change rate.

2. The method of claim 1, wherein the predetermined strength is about 50 dBuV.

3. The method of claim 1, wherein the reference change rate is obtained as a first order function with respect to the wave strength.

4. The method of claim 3, wherein the first order function produces 15 dB/sec at the predetermined strength of the wave strength and 20 dB/sec at the wave strength of 100 dBuV.

5. An audio system of a vehicle comprising:

an on-glass antenna fixed to a window of a vehicle for receiving radio waves;

an on-glass antenna amplifier for amplifying the signals of the on-glass antenna;

a controller for detecting wave strength of the radio waves in a running state of the vehicle and for controlling the on-glass antenna amplifier on the basis of the wave strength; and a tuner for detecting a signal from signals received from the on-glass antenna amplifier, wherein the controller executes instructions for:

detecting wave strength of the radio waves at a running vehicle;

determining whether the wave strength is above a predetermined strength;

calculating change rate of the wave strength when the wave strength is above the predetermined strength; and controlling amplification of the radio wave received by the on-glass antenna on the basis of the change rate of the wave strength, wherein the controlling of amplification of the radio wave comprises:

determining whether the change rate of the wave strength is above a reference rate that is obtained as a function of the wave strength;

cutting off power supply of an on-glass antenna amplifier for amplifying signals of the on-glass antenna when the change rate of the wave strength is above the reference change rate; and maintaining power supply of the on-glass antenna amplifier when the change rate of the wave strength is not above the reference change rate.

6. The audio system of claim 5, wherein the predetermined strength is about 50 dBuV.

7. The method of claim 5, wherein the reference change rate is obtained as a first order function with respect to the wave strength.

8. The method of claim 7, wherein the first order function produces 15 dB/sec at the predetermined strength of the wave strength and 20 dB/sec at the wave strength of 100 dBuV.

* * * * *